United States Patent
Gerk et al.

(10) Patent No.: US 7,841,299 B2
(45) Date of Patent: Nov. 30, 2010

(54) METHOD AND APPARATUS FOR APPLYING HOOF CARE, SANITIZING, OR TREATMENT SOLUTIONS TO THE FEET OR HOOVES OF ANIMALS

(75) Inventors: John K. Gerk, Julesburg, CO (US); Eric H. Bonewitz, Overland Park, KS (US)

(73) Assignee: Jot Holdings, LLC, Kansas City, MO (US)

( * ) Notice: Subject to any disclaimer, the term of this patent is extended or adjusted under 35 U.S.C. 154(b) by 42 days.

(21) Appl. No.: 12/039,944

(22) Filed: Feb. 29, 2008

(65) Prior Publication Data

US 2008/0216762 A1 Sep. 11, 2008

Related U.S. Application Data

(60) Provisional application No. 60/892,751, filed on Mar. 2, 2007.

(51) Int. Cl.
*A01K 29/00* (2006.01)
(52) U.S. Cl. ........................ 119/651; 119/673

(58) Field of Classification Search ............... 119/673, 119/667, 669, 665, 671, 678, 650, 651; 4/574.1, 4/622; D24/204
See application file for complete search history.

(56) References Cited

U.S. PATENT DOCUMENTS

| | | | | |
|---|---|---|---|---|
| 2,870,478 | A * | 1/1959 | Schuster | 452/173 |
| 5,630,379 | A * | 5/1997 | Gerk et al. | 119/667 |
| 5,774,909 | A * | 7/1998 | Stable | 4/622 |
| 6,382,136 | B1 * | 5/2002 | Bragulla et al. | 119/650 |
| 6,739,286 | B2 * | 5/2004 | Vander Veen | 119/673 |
| 2007/0074672 | A1 * | 4/2007 | Torgerson et al. | 119/667 |

* cited by examiner

*Primary Examiner*—T. Nguyen
(74) *Attorney, Agent, or Firm*—Husch Blackwell LLP

(57) ABSTRACT

A foot bath for animal hoof use is continuously or intermittently replenished with treatment solution while in service. This technique maintains a consistent concentration of treatment chemical, dilutes organic matter deposited in the foot bath and effects removal of fibrous material while maintaining the foot bath in continual service for efficacious treatment.

8 Claims, 2 Drawing Sheets

METHOD AND APPARATUS FOR APPLYING HOOF CARE, SANITIZING, OR TREATMENT SOLUTIONS TO THE FEET OR HOOVES OF ANIMALS

CROSS-REFERENCE TO RELATED APPLICATION

This application claims the benefit of and priority to U.S. Provisional Patent Application No. 60/892,751, filed Mar. 2, 2007, entitled METHOD FOR APPLYING HOOF CARE, SANITIZING, OR TREATMENT SOLUTIONS TO THE FEET OR HOOVES OF ANIMALS AND A DEVICE FOR ITS ACCOMPLISHMENT, which document is hereby incorporated by reference to the extent permitted by law.

BACKGROUND OF THE INVENTION

This invention relates to a method of applying foot or hoof sanitizing type solutions to the feet of animals where the solutions are consistently maintained at an efficacious level over time. Additionally, this invention relates to a device that enables the maintenance of such an efficacious level.

For years, directing walking animals through foot baths containing foot or hoof care solutions has been practiced as an aid to general foot or hoof health or for the prevention of, and a cure for, diseases of the animals' feet or hooves. Materials used for these solutions included (and include) copper sulfate, zinc sulfate, formaldehyde, and certain antibiotics. Additionally, several over the counter commercially compounded liquid products have been and are being used. Major manufacturers of this latter category are Delaval (DoubleAction), Westfalia-Surge (Pedicure Rx), and SSI Corporation (Healthy Foot).

The foot baths used were typically constructed of wood, metal, or plastic/fiberglass materials. The dimensions of these foot baths had varying lengths, widths and depths and were constructed to be sealed so that the foot or hoof care solution did not leak out of the foot bath. An example of typical foot bath constructive design resembles an "open topped box" that is 6 feet long, 32 inches wide, and six inches deep with a closed and sealed bottom. The depth of the water and foot or hoof care solutions held in the foot bath varied depending on the operator's preference. Today, the basic design of most foot baths remains the same.

Foot baths are inefficient and costly for several reasons.

As the animals enter the foot bath, there is a high probability that manure attached to the animals' hooves will be carried into the foot bath or that the animal will defecate into the foot bath solution. Additionally, depending upon environmental conditions, the animals may also have layers of mud and dirt clinging to the feet. Foot baths are liquid filled reservoirs that retain all environmental contaminants deposited in them. The manure or combination of manure and mud/dirt or organics rapidly degrades the foot bath solution and renders it ineffective.

Most commercially available foot or hoof care products degrade in the presence of organic contamination. This organic contamination offers challenges to most foot or hoof care materials which have been added to the bath for their intended purpose. The rate of degradation increases as more and more organic material is deposited into the foot bath, and often this degradation is exacerbated by the length of time that the foot or hoof care material is exposed to the organics. As contamination in the foot bath increases, the efficacy of the foot or hoof care material is eventually reduced to a point where the foot bath becomes inefficacious and must be evacuated and cleaned.

Traditionally, the manner of evacuating the foot bath relied on the operator picking up one end of the bath and dumping the contents on the floor or removing a drain plug which had been fabricated into one end and then allowing the spent solution to drain onto the floor. Cleaning of the foot bath relied on a worker cleaning it out with a hose and water. This method of evacuation and cleaning is still common today.

Charging the foot bath with a new foot or hoof care solution involved filling the bath with clean water, adding the foot or hoof care material to the bath, and then stirring or agitating the bath contents so that the foot or hoof care material was put into adequate solution. Alternatively, the foot or hoof care compound was added before or during the water addition stage and the action of the water filling the bath provided the agitation required to provide proper mixing. These practices are still widely used today.

Unfortunately, evacuating and cleaning foot baths is an unpleasant job. It is time consuming, and the individual performing the task is required to work closely with a solution laden with animal fecal matter. As a result, foot bath management is often avoided by not only workers but also by owners of the animal operation.

Additionally, the properly regimented use of a foot bath as a prophylaxis in prevention of foot or hoof disease is not always appreciated and sometimes simply is not possible. The impossibility is most generally present in high production dairy facilities where cows are always present in the area where foot baths are located and workers simply can not enter the area (either safely or actually or because of production time constraints) to perform the evacuation, cleaning, and refilling steps required. Accordingly, foot baths are not always used as frequently as they should be.

Finally, a lack of understanding on the part of owners and workers regarding the need to frequently evacuate, clean, and recharge foot baths to maintain efficaciousness often resulted in substandard achievement of the results intended to be achieved in the use of the foot bath. As such and as a result of one or more of the foregoing factors, several companies have recently developed "automatic foot baths". The intention of these inventions has been to overcome the foregoing reasons for failure which have, as their root cause, the "human interface" in the foot bath operation and maintenance process.

Essentially, these automatic baths automatically evacuate, clean, and refill themselves. Typically, automatic evacuation is accomplished by an automatic drain valve (or other device) opening at a predetermined time or at predetermined time intervals and allowing the contents of the foot bath to completely drain onto the floor. Once drained, automatic foot baths then cycle into a "cleaning mode".

Any organic material remaining in the foot bath after draining is then flushed out with one or more spray nozzles which are mounted within the foot bath and connected to a water source. The flush water is allowed to flow when a valve between the water source and the nozzle(s) is opened. The opening of the valve is automatic and its opening is activated using a control which sends the opening signal based on time or some other metric. Typically, the valves referred to herein are automatically controlled through a solenoid or other device which enables programmable and automatic opening and closing of valves.

Once the foot bath has been adequately flushed and cleaned, the drain valve (or other device) closes and the foot bath is refilled with water and a foot or hoof care solution. The source for the water used for refilling may be the same source as that used for flushing or a separate source where the actuation and termination of flow is effected by a separate solenoid valve. A foot or hoof care material is typically injected into the water source used to refill the foot bath but may instead be added via a dedicated plumbing circuit.

Once the foot bath has been filled with the foot or hoof care solution, it is then ready to treat more animals. After filling, and once the predetermined time has passed, the controls of the automatic foot bath then repeat the actuation of the drain, clean, and refill cycles. Generally, depending on the volume of foot or hoof care solution contained in the foot bath and the type and/or strength of the foot or hoof care material used, the number of animals that will walk through the foot bath between the initial filling (or refilling) and draining is typically from 125 to 500 cows.

While the automatic foot baths available today deliver some distinct advantages when it comes to labor savings, reduction of management (human interface) issues, and repeatability of performance, they still share a common disadvantage with manually operated foot baths. That is, the operations of both the manual and automatic versions of foot baths are suboptimal chemically speaking. Like a manual foot bath, they work on a "batch" basis. That is, the foot bath is "made up" for treating a finite number of animals such as milk cows. This batch basis operation leads to several disadvantageous characteristics.

First, because of the contamination issues herein previously cited, the amount of foot or hoof care material initially added to the foot bath must contemplate the degradation of that material if the foot bath is to have the level or proper concentration of active foot or hoof care solution present when the last animal intended to be treated walks through the bath. In other words, the solution of foot or hoof care material must be stronger than required for the first animals walking through the bath since the materials will degrade in the presence of organics and the solution must still be sufficiently strong to be efficacious for the last animal through the bath.

The foregoing phenomenon is depicted on Table 1. below. (Since with many hoof care chemicals an acidic condition is required, the pH level of the foot bath at any point in time predicts effective solution strength. In this regard, the pH level of the bath is also an effective prediction of efficacy.)

In this test, 50 gallons of water and 1.25 gallons of a commercially available acid based hoof care chemical were mixed in the foot bath. pH readings were taken at 1 hour intervals until 200 cows had passed through the foot bath. The data were generated at 1,600 cow dairy in Tulare County, Calif. In sum, at the start, the pH registered 0.8 and after 5 hours the pH had reached a pH of 6.2. At 10 hours, the pH had risen to 6.8. By hour 2 the organic contamination in the bath was decidedly noticeable. Large amounts of undigested fiber, having separated from deposited fecal matter, were observed floating in the bath. By hour 4, the accumulation of deposited fecal matter had noticeably thickened the foot bath solutions consistency. By hour 6, the foot bath had the consistency of a viscous sludge.

TABLE 1

1,600 Cow Dairy: pH Response Using Current Art of Making One Water & One Chemical Additon to Foot Bath

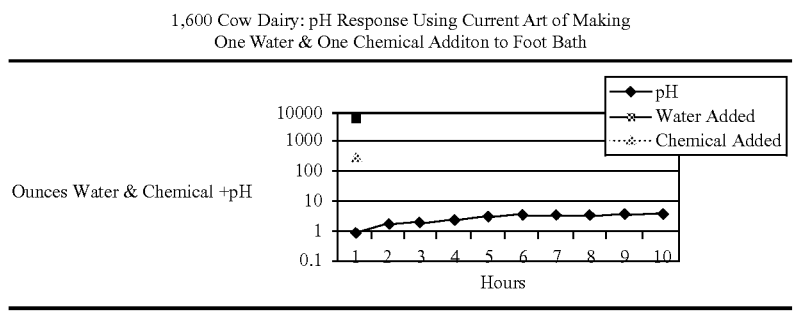

In a separate test at this same dairy, the label instructions of the commercially available, acid based hoof care chemical were followed. To a clean 50 gallon foot bath, ¾ of a gallon of the hoof care chemical was added and pH readings of the foot bath were taken once per hour until the label recommended level of 200 cows had walked through the foot bath. For purposes of determining predictable efficacy, the traditional industry standard for bactericidal activity (pH 4) was used. Table 2. below depicts the results of that test.

TABLE 2

1,600 Cow Dairy: Chemical Addition to Achieve Required pH at Last of 200 Cows Through Foot Bath

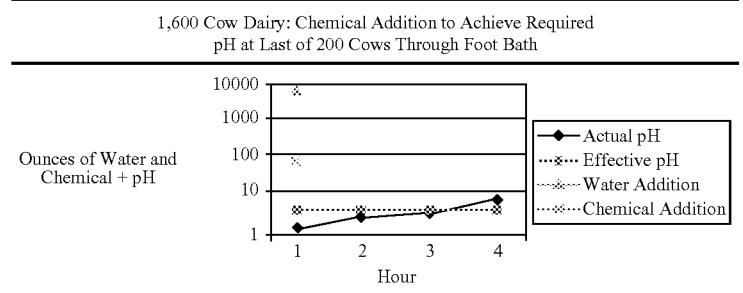

In this test, the pH at the beginning of the test was 1.2. At the end of the test, the pH was 5.1. Assuring the traditional industry standard is correct, approximately 80% of the cows first passing through the bath would have received an efficacious treatment and the last 20% of the cows passing would have received an inefficacious treatment.

Logically, it is the animals with foot or hoof problems that can most benefit from the strongest foot or hoof care solution. Unfortunately, it is these animals which most generally walk through the bath last. This is true simply because these animals' feet hurt and they therefore walk more slowly than their pen mates with healthy feet or hooves.

Thus, the healthy pen mates reach the foot bath first and begin depositing organic material therein, thereby degrading it. The "solution strength curve" that results from the current batch method of managing foot baths is precisely the opposite of what it should be in the context of animal foot or hoof health and the order in which animals pass through the foot bath. That is, animals with foot or hoof problems should be walking through the strongest strength solution and while those animals without problems could conceivably afford to be walking through the foot bath last when solution strength is degraded.

Second, because of the degradation curve, more foot or hoof care material must be used in a foot bath than would be required if the foot or hoof care solutions did not degrade or the solution strength could be maintained at a constant level over the period animals were walking through it. For this reason, in an effort to control costs, owners of these foot baths often operate these foot baths less frequently than may be required to maintain optimal foot or hoof health for the animal.

Finally, in high production operations, the automated evacuation, cleaning, and refilling cycles often take place while animals are passing through the foot bath. The result is that during this cleaning cycle period the animals passing through the bath are not being treated as intended.

In summary, even though automation of the dump, fill and dosage cycle has contributed to the management considerations of the foot bath, like traditional foot baths, the cost and efficacy of the foot bath solution throughout the use period of the solution has not been improved. Improper management, organic considerations, improper use of treatment and prevention products, and the tendency for target animals to be the last through the foot bath, all greatly reduce the efficacy and cost effectiveness of foot baths.

Therefore, there is a great need for a method to provide more effective application of foot disease treatment solutions that mitigate the degrading effect of organic contaminants introduced into the foot bath solution. Also needed is a method providing a device to facilitate the method and reduce costs of operation while providing low maintenance and ease of use for owners. Additionally needed is a method that enables animals to walk through the foot bath during its normal maintenance and which insures that all animals are treated as intended.

SUMMARY OF THE INVENTION

The present invention substantially reduces or overcomes all of the above problems associated with the prior art. The inventive method insures that an essentially constant and consistent level of efficacy is maintained by continually (or intermittently) introducing sanitizing or treatment compounds into the foot bath rather than maintaining the foot bath using a batch type method. Such introduction of sanitizing or treatment compounds can be carried out continually over time or can be added incrementally over time. Such additions can be based simply on time or on some other metric such as the number of cows expected to traverse the foot bath during a given period of time or a single cow or number of cows entering the foot bath between additions without regard to time. Further the inventive method includes introducing the sanitizing or treatment compounds in solution with, or in conjunction with, water so that a sufficient volume of water is added over time to dilute and displace the organic materials deposited in the foot bath over time. This added water may be introduced to the foot bath continually at a predetermined rate of volume throughout the period between initial make up of the foot bath or in predetermined volume increments throughout the period.

OBJECTS AND ADVANTAGES OF THE INVENTION

It is an object of the present invention to enable the automatic or semi-automatic introduction of hoof treatment solutions to a foot bath at a predetermined or desired strength. It is a further object to automatically or semi-automatically introduce hoof treatment solutions to a foot bath throughout the duration of use of the foot bath so that desired solution strength is maintained during the foot bath's duration of use.

It is also an object of the present invention to provide an automatic or semi-automatic system which enables increased efficacy in the treatment and prevention of foot diseases relative to traditional and automatic dump/fill foot baths.

It is another object of the present invention to maintain a consistent efficacious foot bath solution despite organic contamination being introduced into the foot bath solution.

It is a further objective of the present invention to dilute and/or displace organic matter introduced to the foot bath through its use by animals or humans by automatically or semi-automatically introducing water to the foot bath in amounts sufficient to dilute and/or displace such deposited organic materials.

It is still another object of the present invention to reduce the high level of management required for traditional foot baths.

It is a still further object of the present invention to provide increased cost efficiency over traditional and automatic dump/fill foot baths.

It also an objective of this invention to reduce the amount of foot or hoof care material (such as copper sulfate) which is discharged into the farms sewage lagoon and is ultimately deposited on the farm fields when compared to traditional dump and fill type foot baths.

It is also an object of the present invention to provide a system that may be modular and portable, but which may be permanently mounted at a fixed location.

It is an advantage of this invention to provide a method that automatically or semi-automatically maintains the treatment solution of a foot bath, thereby significantly increasing efficacy of the foot bath solution and reducing required time and costs.

It is another advantage of this invention to automatically or semi-automatically maintain an efficacious foot bath solution regardless of the order in which the animal or person entered the foot bath.

It is a further advantage of this invention that an efficacious foot bath solution is maintained even while organics are being introduced into the foot bath solution, thereby minimizing effort of producers or others in effectively treating livestock or people.

It is an additional advantage of this invention that organic contamination deposited in the foot bath is displaced and/or diluted through the essentially continual (or intermittent) addition of water and foot or hoof care chemicals into the foot bath.

BRIEF DESCRIPTION OF THE SEVERAL VIEWS OF THE DRAWING

In the accompanying drawings that form a part of the specification and that are to be read in conjunction therewith.

DETAILED DESCRIPTION OF THE INVENTION

Figure 1:
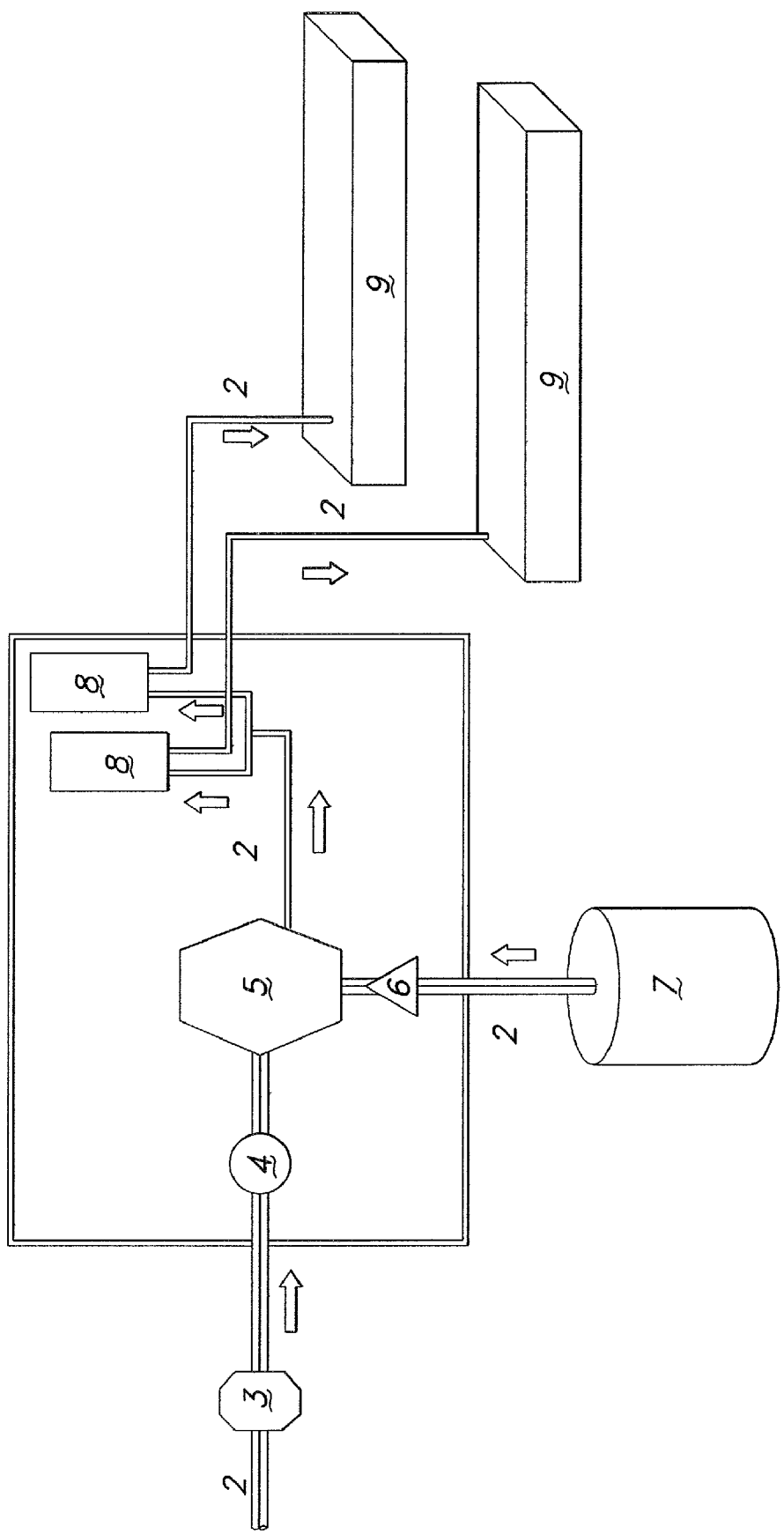
FIG. 1 is a diagrammatic view of a foot bath control system arranged according to one embodiment of the invention.

FIG. 1 is a diagram illustrating a first embodiment of a constant flow foot bath chemical injector. The constant flow foot bath chemical injector includes interconnecting fluid supply lines 2, a back flow preventer 3, a water pressure regulator 4, an adjustable chemical proportioner 5 with check valve 6 and chemical container or reservoir 7, solution volume flow regulators 8 and one or more foot baths 9.

In a typical operation of the constant flow foot bath chemical injector, water is forced along the interconnecting fluid supply lines 2 and through back flow preventer 3. The back flow preventer 3 prevents medications, sanitizers, and/or hoof health materials from back siphoning through the interconnecting fluid supply lines 2 into the water source.

From the back flow preventer 3, the water enters a water pressure regulator 4 (either fixed or adjustable) through the interconnecting fluid supply lines 2 which enables regulation of the pressure and flow of the water source.

Water continues to flow from the pressure regulator 4 through the interconnecting fluid supply lines 2 to the adjustable chemical proportioner 5. As the water flows through the chemical proportioner 5, concentrated chemicals from reservoir 7 (medications, sanitizers, and/or hoof health materials) are drawn from the concentrated chemical reservoir 7 to the adjustable chemical proportioner 5 and are therein mixed with the water in a selected proportion. Between the concentrated chemical reservoir 7 and adjustable chemical proportioner 5 on the interconnecting fluid supply lines 2, a check valve 6 functions to prevent back flow into the concentrated chemical reservoir 7.

The proportioner 5 may be water, electric, air, mechanical, motor driven, hydraulically operated, or operated in any other suitable manner. Also, the device 5 can be an eductor which functions by way of the Venturi effect to draw concentrated hoof care chemical from the concentrated chemical reservoir 7.

After leaving the adjustable chemical proportioner 5, the mixed solution travels through the interconnecting fluid supply lines 2 to one or more solution volume flow regulators 8. The solution volume flow regulator(s) 8 is used to control the volume of mixed solution flow in terms of quantity over time. The solution volume flow regulator(s) 8 can be a manual flow device or an electrically operated device, and may use an adjustable valve, orifice or diaphragm.

From the solution volume flow regulator(s) 8, the mixed solution travels directly into one ore more foot baths 9 or to a storage reservoir that empties its content into foot baths 9. For purposes of clarity, not shown on FIG. 1, but appearing on FIG. 2 is a circuit of fluid supply lines 2a which interconnect to fluid supply lines 2 and which bypass the volume flow regulator(s) and, because of the higher and unregulated flow volume, may be used to fill the foot bath(s) 9 with the intended solution of concentrated hoof care chemical and water in a reasonable amount of time.

Multiple foot bath(s) 9 can be serviced by the device by adding additional solution volume flow regulator(s) 8, interconnecting fluid supply lines 2 and additional foot bath(s) 9.

While the foregoing description has described an embodiment of a constant flow foot bath chemical injector for mixing and regulating medications, sanitizers, and/or hoof health materials to be delivered to the foot bath in accordance with this invention, it is to be understood that the above description is illustrative only and not limiting of the invention. It will be appreciated that the same techniques can be utilized for both animals and humans and depth of the foot bath or bath can be configured to target other parts of the body. The constant flow foot bath chemical injector can be utilized for many types of cleaning liquids, as well as for different types of treatment and prevention solutions. Additionally, the design lends itself toward both permanently fixed and portable baths.

Figure 2:
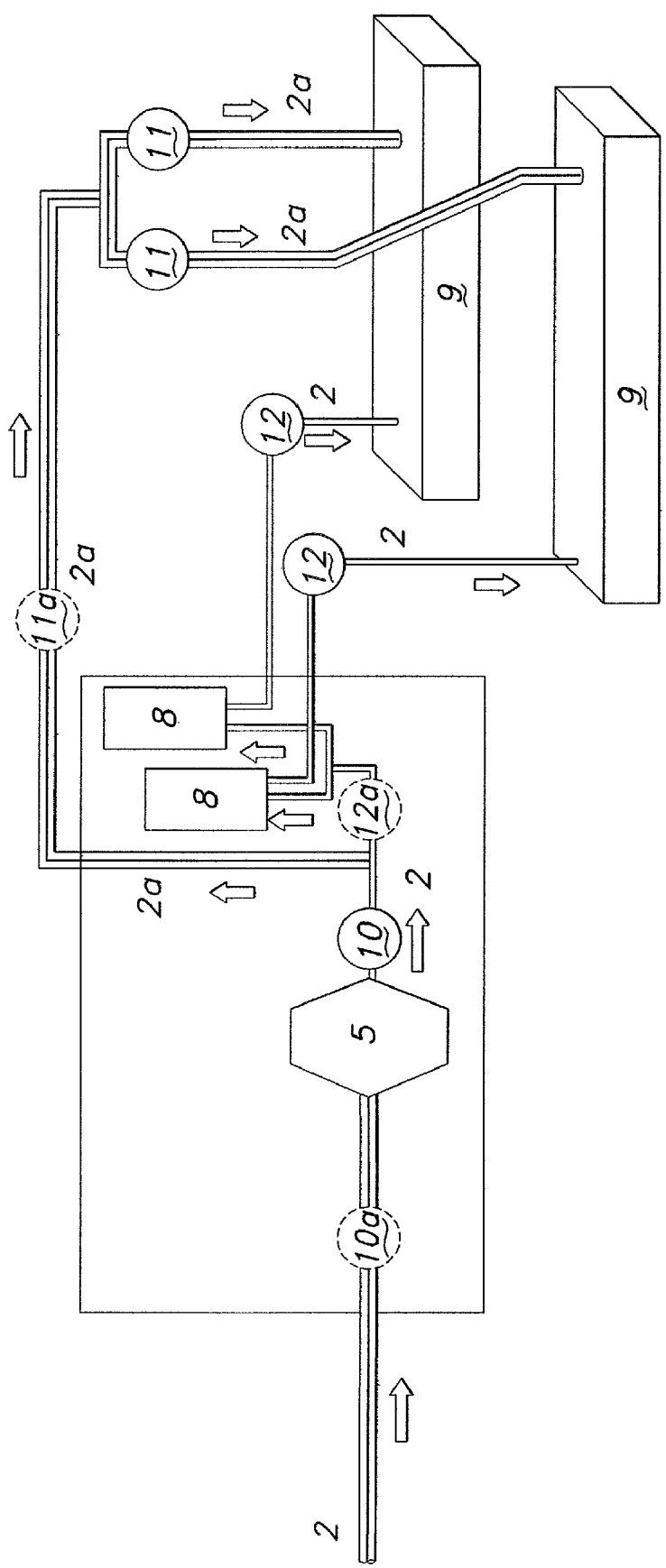
FIG. 2 is a diagrammatic view similar to FIG. 1 of an alternative control system arranged in accordance with another embodiment of the invention.

FIG. 2 depicts an alternative embodiment that includes valves which enable the starting and stopping of the device's operation. Included is the addition of a foot bath filling circuit. For clarity's sake, the following components have been removed from FIG. 2: the backflow preventer 3, the water pressure regulator 4, the check valve 6, and the concentrated hoof care chemical reservoir 7.

To fill the foot bath the operator must first open a master on/off valves 10 and foot bath on/off fill valve(s) 11. This allows water flow through adjustable chemical proportioner 5 which automatically injects chemical into the water stream 2 in an amount which has been predetermined by the selected proportioning setting affected on the adjustable chemical proportioner 5. The properly constituted solution then flows from the water stream circuit 2 into water/solution stream 2a and into one or more foot baths 9. When the foot baths 9 are filled, the operator closes the foot bath fill on/off valve 11.

The operator then opens continual flow solution on/off valve(s) 12 to initiate water and chemical solution flow from the proportioner 5 through water stream circuit 2 through solution volume flow regulator(s) 8, through the continual flow solution on/off valve(s) 12, and into the foot bath(s) 9. Once the flow into the foot bath(s) has been effected, the operator then adjusts the solution volume flow regulator(s) 8 to deliver the proper flow (of water and foot bath chemical in solution) as measured in a standard volume per minute or per hour. The foot bath is now ready for use. FIG. 2 also illustrates alternate valve positions shown as valves 10a, 11a, and 12a.

When all animals have traversed the foot bath and/or when it has been determined that it is time to evacuate and clean the foot bath, the operator closes the continual flow solution on/off valve(s) 12 and the master on/off valve 10. This action stops the flow of water through all circuits and disables the adjustable chemical proportioner 5.

The following examples illustrate the results that have been attained through use of the inventive method and system.

Example 1

An experiment was conducted on a 1,600 cow dairy in Tulare County, Calif. to determine the pH response of continual addition of water and chemical in solution into a foot bath over time. The foot bath was initially filled with 50 gallons of water which water first flowed through the inventive device described herein (water driven proportioner) where the proportioner had been set to deliver a 1.25% solution of a commercially available, acid based hoof care chemical. After filling, the filling circuit valve 11 as described herein was closed and the solution flow control valve 12 was opened. The solution flow valves 12 were set to provide a flow rate of 960 ounces per minute (approximately 7 gallons per hour) of the 1.25% chemical and water solution. The foot bath was not evacuated or cleaned during the test's duration.

In this test, the target pH for the bath on a continual basis was 2.0 because, while the traditional wisdom in the industry is that a pH of 4.0 is required for bactericidal activity, data clearly shows that solutions with a pH of 2.0 in and of themselves provide a bacteristatic condition where bacteria will not duplicate. Accordingly, the logic was that an active ingredient (copper sulfate) designed to work in acidic conditions would perform better at a pH of 2.0 pH levels of the foot bath were taken once per hour for 10 hours. Table 3 provides the results of the data collected in graphic form.

TABLE 3 pH Response to Water (with Chemical in Solution) Injected Continuously Over Time into a Foot Bath

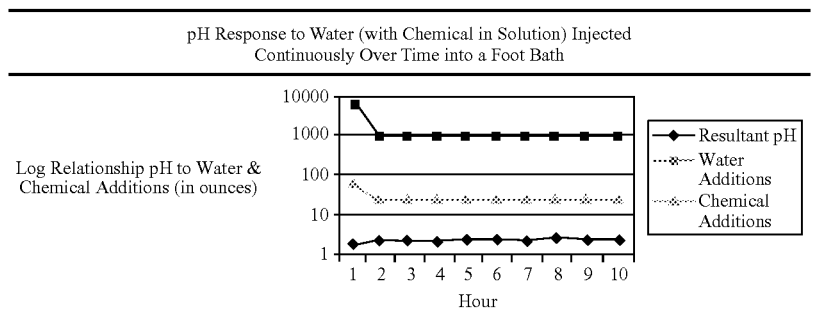

The results of this test showed that the pH of the initial 50 gallon fill was 1.3 and by hour three, the pH had risen to 2.0. The pH varied slightly over time, ranging from 1.9 to 2.2 from hours 4 through 10, and appeared to do so randomly with an ending pH at hour 10 of 2.1. During the full 10 hours of this test, the foot bath remained decidedly liquid and, compared to the test depicted in Table 1, had no sludge like consistency at any point during the test and also had considerably less observable undigested fiber floating on the surface. This last result is attributable to the continuous addition of water and since, over the 10 hour period, 140% of the foot bath's original volume of 50 gallons had been added, fibrous material and other particles of fecal matter were displaced by the additional water and they were thereby evacuated from the bath as the water level increased and exceeded the foot bath's holding capacity.

Example 2

A test was run on a 1,600 cow dairy farm in Tulare County, Calif. to determine efficacy of the inventive method and device compared to conventional practice. The dairy's standard practice was a conventional procedure that involved making up a foot bath of 50 gallons of water and 25 lbs. of copper sulfate for each 400 cows. This regimen required evacuating the spent foot bath after 400 cows had passed and then making up a new foot bath. The regimen dictated that these treatments be performed once per day for 4 days per week. Once per week, each week, employees identified animals with active lesions (interdigital dermatitis or "hairy warts) and these animals were separated from the herd and held for treatment by a hoof trimming professional. Review of the dairy farm's records showed that the dairy experienced an average of 22 lesions per week, with a high of 36 and a low of 13. Table 4. depicts the results noted in this record review.

TABLE 4

Recorded Lesions over an 8 Week Period on a 1,600 Cow Dairy Farm

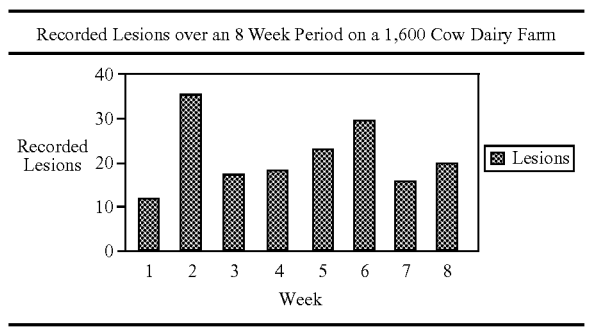

Example 3

A test was conducted over an 7 week period to determine the effectiveness of the inventive device and method. A 1.25% solution of a commercially available acid based hoof care material was injected into the foot bath using the inventive device so that animals received one treatment per day on four days of each week. Additionally, 8 lbs. of copper sulfate was manually added to the foot baths at the initial filling of each foot bath and again at hour 5. The results are depicted in Table 5. Note that Week 1 results on Table 5. were the recorded lesions the day before the initiation of use of the inventive method and device for this test.

TABLE 5

7 Week Test; Wart Incidence on 1,600 Cow Dairy Using the Inventive Method & Device

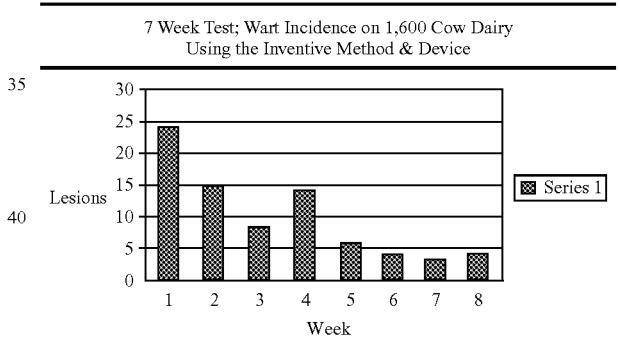

The results of this test indicated continual weekly reductions in observable lesions over the first 2 weeks (weeks 2 & 3 on Table 5). However, at the end of Week 4 an increase in lesions was observed. During investigation of Week 4 results it was discovered that the inventive device had been reset to deliver a 0.8% solution rather than the recommended 1.25% solution of hoof care chemical. How or why the device was reset was unknown and while the results observed at Week 4 can not be positively correlated to the solution percent "reset", the resulting increase in lesions provides anecdotal evidence supporting the notion that lower pH levels do indeed improve performance of acid based hoof care chemicals. After the inventive device was returned to a 1.25% setting, lesion reductions continued to be observed and reached a low of 3 in weeks 6 (7 on Table 5), but increased to 4 in week 7 of the inventive method's and device's use (8 on Table 5).

The inventive device is a low maintenance system which delivers measured dosages of medication at a continuous and consistent dosage rate for the prevention and treatment of diseases and which overcomes the heretofore human interface or management issues. As an alternative to continuous dosage, the device could incorporate sensors or devices which deliver measured dosages of sanitizers or medication incrementally while the device remains in service based on the number of animals or people entering the foot bath apparatus or simply incrementally over time rather than continuously. In either event, the foot bath does not require evacuation, cleaning, and refilling at any time during the process in which it is being used.

The invention may be employed wherever and whenever it is desired to maintain a consistent treatment/prevention solution for group(s) of animals or people to treat or prevent disease. For example, the invention may be used with a herd of livestock, a new group of animals being introduced into a facility, for bio-security control in animal livestock facilities, hospitals or food processing facilities, in pharmaceutical facilities, or in any facility where bio security is of concern. The device may be constructed to be modular and portable and may be transported to any necessary location or may be permanently mounted at a fixed location.

The treatment solution is delivered to the foot bath solution by a metering device, proportioner, or pump which ensures that each animal or person is exposed to the proper concentration of treatment and prevention solution every time the animal or person walks through the foot bath solution. The metering device proportioner, or pump maintains and increases the efficacy and cost effectiveness of the treatment and prevention solution in the foot bath.

Unlike traditional or automatic dump/fill foot baths, the components of the invention insure that an efficacious treatment and prevention solution is maintained at a reasonably constant level of strength and available to each animal or person that passes through the foot bath regardless of the order of an animal or person entering the foot bath. Additionally, this invention enables the addition of sufficient amounts of water to the foot bath to insure that organic materials deposited therein are sufficiently diluted and displaced so that organically induced degradation of the introduced hoof care materials is significantly reduced.

The metering device, proportioner, or pump can be adjusted to deliver different dosages of treatment and prevention solution if desired. A commercial example of the proportioner is a Dosatron Water Driven Proportioner manufactured by Dosatron, Inc. of Clearwater, Fla. Another example is an LMI (Liquid Metronics, Inc). metering pump manufactured by LMI Milton Roy of Ivyland, Pa. An example of a pump is an 8000 series pump supplied by SHURflo Corporation of Cypress, Calif. Adding to the convenience of the operation of the proportioning, metering or pump devices and minimizing human interface or operation inconveniences is a series of valves (either automatic or manual) which may control the start/stop functions.

While the device may incorporate other types of proportioning devices (electric, air driven, etc.), in this embodiment the proportioning device is water driven. Being water driven, valves placed in the system may simply be opened or closed to start or stop the system's operation. That is, if all valves in the system are closed, water may not flow from the water source and the system can not and will not operate. By opening all valves in any circuit of connective tubing between the water source and a foot bath (as shown in FIG. 2), water begins flowing through the proportioning device from the water source and through the open valve(s) where hoof care materials, then in solution with water, flow into the foot bath(s) as intended. Closing any one valve in a given circuit of connective tubing will stop this flow. Closing any one valve in each of a plurality of connective tubing circuits will completely stop the water flow and operation of the proportioning device and the complete system.

Additional embodiments of this design include pump driven systems which deliver chemicals or sanitizers to the foot bath. In the case of an electrical pumping device that only pumps medications, sanitizers, or hoof care chemicals through a dedicated plumbing circuit, water may be supplied by a separate dedicated plumbing circuit, and the pump's operation may be controlled by a system comprised of electrical relays and timers and/or sensors so the pump injects predetermined amounts of chemical into the foot bath intermittently or continuously over the time in which the foot bath is in operation.

The method of treatment is more economical than prior methods because it requires less total medicating or in accordance with the present invention sanitizing solution for a given number of animals. This saves the owner of the animal money. This factor is demonstrated in Table 6 below. In Table 6, costs are predicated on amounts of product used at current product costs had products used in tests been incurred by the user.

TABLE 6

Comparative Foot bath Costs
Copper Sulfate vs SuperBooster + Precharge of Copper Sulfate

| Cows | Chemical | Pounds Used Per Day | Treatements Per Week | Pounds Used/Week | Pounds Used/Year | Cost/Lb | Cost/Year | Cost/Cow Per Year |
|---|---|---|---|---|---|---|---|---|
| 750 | Copper Sulfate | 50 | 7 | 350 | 18,200 | $ 1.00 | $18,200.00 | $24.27 |
| | | | | Gallons or lbs/Wk | Gallons or lbs/Year | Cost/Gal or Pound | Cost/Year | Cost/Cow Per Year |
| 750 | SuperBooster Precharge | 1.5 gallons | 7 | 10.5 | 546 | $20.00 | $10,920.00 | $14.56 |
| | CuSO$_4$ | 4 | 7 | 28 | 1,456 | $1.00 | $1,456.00 | $1.94 |
| | | | | | | | Total Booster + Copper Sulfate Precharge | $16.50 |
| | | | | | | | Saving/Cow/Year | $7.77 |

This invention reduces the amount of foot or hoof care material (such as copper sulfate) which is discharged into the farm's sewage lagoon and is ultimately deposited on the farm fields when compared to traditional dump and fill type foot baths. Copper has been shown to create toxic conditions for crops with resulting reductions in yields. Further, copper sulfate deposited on fields can ultimately find its way into ground water through leeching or into water supplies through run off. This factor is demonstrated in Table 7 below.

TABLE 7

Metallic Copper Discharge
Copper Sulfate vs SuperBooster + Precharge of Copper Sulfate

| Product | Wt/Unit | % Copper | Units/Year | lbs Copper Content | |
|---|---|---|---|---|---|
| Copper Sulfate | 1 | 25% | 18,200 | 4,550 | |
| Super Booster Precharge | 11.25 | 3% | 6,143 | 184 | |
| CuSO$_4$ | 1 | 0.25 | 1,456 | 364 | |
| | | | Total Booster + Copper Sulfate Precharge Discharge | 548 | % Copper Reduction |
| | | | Reduction of Copper Discharge | −4,002 | 87.95% |

What is claimed is:

1. A method of operating a foot bath containing a treatment solution including a treatment chemical, comprising the steps of:
   introducing said treatment chemical at a selected concentration; and
   maintaining said concentration at a substantially constant concentration by substantially continuously introducing into said foot bath said treatment chemical.

2. A method as set forth in claim 1, wherein said treatment chemical comprises medication.

3. A method as set forth in claim 1, wherein said treatment chemical comprises sanitizer.

4. A method of operating a foot bath containing a treatment solution that includes water and a treatment chemical, comprising the steps of:
   determining an effective concentration of said treatment solution;
   continuously adding water to said foot bath in a selected quantity to maintain said effective concentration at a substantially constant concentration; and
   continuously adding said treatment chemical to said foot bath in a selected quantity to maintain said effective concentration at said substantially constant concentration.

5. A method as set forth in claim 4, wherein the water and treatment chemical are mixed together and then added to said foot bath together.

6. A method as set forth in claim 4, wherein the water and treatment chemical are added separately to said foot bath.

7. A method of operating a foot bath containing a treatment solution including a treatment chemical, comprising the steps of:
   introducing said solution at a selected concentration; and
   intermittently and continuously adding to said foot bath while it remains in service said solution containing said treatment chemical to maintain said concentration at a substantially constant concentration.

8. A method as set forth in claim 7, wherein said treatment chemical is selected from the group consisting of a medication, a sanitizer, and a hoof treatment material.

* * * * *